June 9, 1931.  D. R. PASSAUER  1,809,724

VALVE

Filed May 31, 1930

D. R. Passauer, INVENTOR

BY Victor J. Evans

ATTORNEY

Patented June 9, 1931

1,809,724

UNITED STATES PATENT OFFICE

DEE R. PASSAUER, OF LUCINDA, PENNSYLVANIA

VALVE

Application filed May 31, 1930. Serial No. 458,777.

This invention relates to new and useful improvements in valves and has for the primary object, the provision of a device of the above stated character which will be self closing or automatically closed by the pressure from the device to which the valve is attached, consequently assuring a leak-proof valve and one requiring manual operation before the valve is open.

Another object of this invention is the provision of a novel construction of valve or closing element and seat therefor which will automatically seat itself and be further forced in engagement with the seat by the pressure from the device to which the valve is applied and which is so designed that the closing element or the seat may be easily removed for repair when necessary.

A further object of this invention is the provision of a valve of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which.

Figure 1:
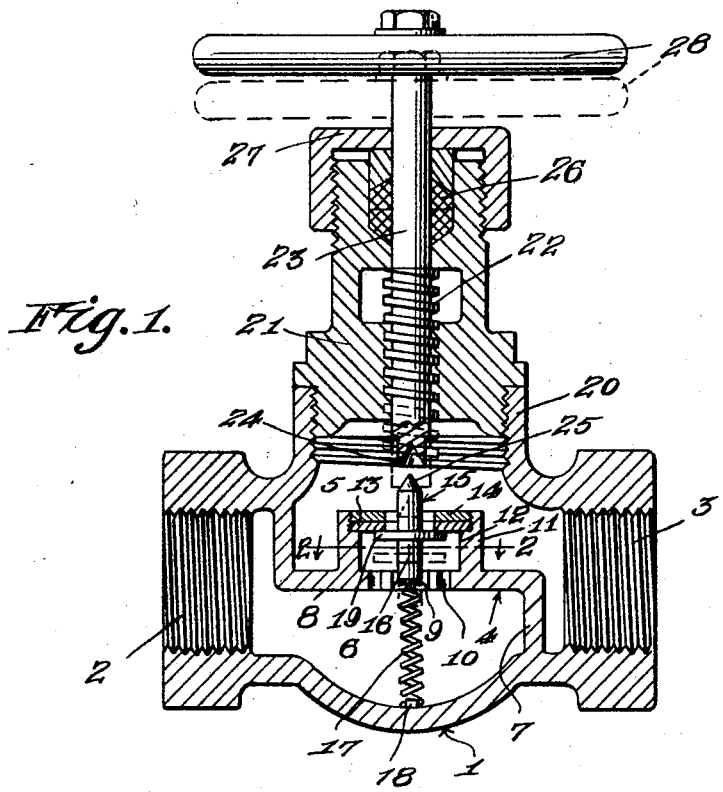
Figure 1 is a vertical sectional view illustrating a valve constructed in accordance with my invention.
Figure 2:
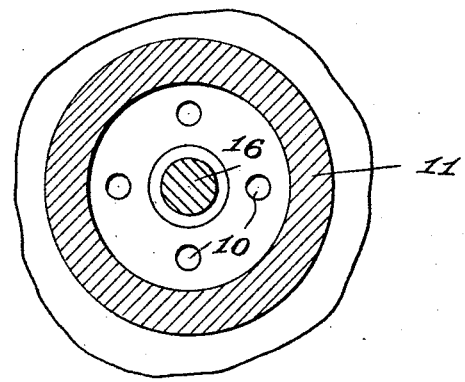
Figure 2 is a sectional view taken on the line 2—2 of Figure 1.

Referring in detail to the drawings, the numeral 1 indicates the body of a valve having oppositely disposed inlet and outlet internally screw threaded ports 2 and 3 respectively separated by a spider 4 formed within the body and which provides chambers 5 and 6. The spider 4 includes vertical portions 7 formed integrally with the body 1 and also a horizontal portion 8 provided with a central opening 9 and a plurality of annularly arranged openings 10 to permit air or liquid to pass from the inlet port 2 to the outlet port 3. An annular flange 11 is formed on the horizontal portion 8 of the spider 4 and has formed in its upper end a shoulder 12 on which is positioned a gasket or valve seat 13 and the latter is forced in engagement with the shoulder 12 by a disk 14 threaded in the upper end of the flange 11. The disk 14 is provided with a suitable slot to receive a screw-driver or similar instrument for threading the disk into and out of the flange 11 as desired.

A closure element 15 including a stem 16 is slidably mounted in the opening 9 of the spider 4 and extends upwardly through alined openings formed in the gasket 13 and disk 14 and has its lower end engaged with a coil spring 17 mounted in the body as shown at 18 for the purpose of normally urging the stem 16 upwardly and the disk 19 thereof in engagement with the gasket, consequently closing the passage between the inlet port 2 and the outlet port 3.

An annular neck 20 is formed on the body and is of such a size that it will permit the disk 14, gasket 13 and closure element 15 to be easily and quickly removed and replaced in the body when desired. A valve stem neck 21 is threaded into the neck 20 and is provided with a central bore provided with screw threads to receive corresponding threads 22 formed on a valve stem or operating member 23, the lower end of which is recessed or substantially conical shape as shown at 24 to receive or engage the upper conical shaped end 25 of the stem 16. A packing gland 26 is located in the end of the stem neck 21 and held in engagement with the member 23 by means of a cap 27 threaded to the upper end of the neck 21. A suitable hand wheel 28 is secured to the outer end of the member 23 whereby a person may easily rotate the member 23 in either direction for the purpose of unseating the closure element 15 or to permit the latter to automatically seat itself.

In operation the valve is especially designed for use in conjunction with an air supply means and an air reservoir. However the device is capable of other applications for controlling gas, or any other fluid. A compressor is preferably connected to the outlet port 3 while the reservoir is connected to the inlet port 2 in any well known manner so that when the compressor is stopped, the closure element 15 automatically closes and cuts off the back pressure to the compressor. The closure element 15 is aided in moving to a closed position and held in such a position by the pressure from the reservoir connected to the inlet port 2.

While I have shown and described the preferred embodiment of my invention, it will be understood that minor changes in construction, combination and arrangement of parts may be made without departing from the spirit and scope of the invention as claimed.

Having thus described the invention, what I claim is:

1. A valve comprising a body, a wall in said body and having a passage, a flange on the wall about the passage, a valve seat removably secured to the flange, a closure element for the valve seat and normally urged in engagement therewith by the fluid pressure in the body, and a manually operated means to unseat the closure element.

2. A valve comprising a body, a wall in said body and having a passage, a flange formed on the wall about the passage, a gasket carried by the flange, a disk detachably securing the gasket to the flange and cooperating with the latter in forming a valve seat, a spring pressed closure element for the seat, and a manual control means carried by the body to disengage the closure element from the valve seat.

3. A valve comprising a body, a wall in said body and having a passage, a valve seat carried by the wall, a stud slidably mounted in the wall, tension means engaging the stud and the body, a disk carried by the stud to engage the seat under the influence of the tension means and the pressure in the body, and a manually operated stem carried by the body to engage the stud to disengage the disk from the seat.

In testimony whereof I affix my signature.

DEE R. PASSAUER.